(12) United States Patent
Thomas et al.

(10) Patent No.: US 9,298,079 B2
(45) Date of Patent: Mar. 29, 2016

(54) SONAR PREVIEW MODE

(71) Applicant: Navico Holding AS, Egersund (NO)

(72) Inventors: Steve Thomas, Tulsa, OK (US); Aaron Coleman, Broken Arrow, OK (US)

(73) Assignee: Navico Holding AS, Egersund (NO)

( * ) Notice: Subject to any disclaimer, the term of this patent is extended or adjusted under 35 U.S.C. 154(b) by 345 days.

(21) Appl. No.: 13/759,760

(22) Filed: Feb. 5, 2013

(65) Prior Publication Data

US 2014/0010042 A1    Jan. 9, 2014

Related U.S. Application Data

(60) Provisional application No. 61/668,965, filed on Jul. 6, 2012.

(51) Int. Cl.
| | | |
|---|---|---|
| *G01S 15/00* | (2006.01) | |
| *G03B 42/06* | (2006.01) | |
| *G01S 15/89* | (2006.01) | |
| *G01S 7/60* | (2006.01) | |
| *G01S 7/62* | (2006.01) | |

(52) U.S. Cl.
CPC . *G03B 42/06* (2013.01); *G01S 7/60* (2013.01); *G01S 7/6236* (2013.01); *G01S 7/6272* (2013.01); *G01S 15/89* (2013.01)

(58) Field of Classification Search
USPC .......................................................... 367/88
See application file for complete search history.

(56) References Cited

U.S. PATENT DOCUMENTS

| | | | |
|---|---|---|---|
| 4,829,493 A | 5/1989 | Bailey | |
| 4,879,697 A | 11/1989 | Lowrance et al. | |
| 5,025,423 A | 6/1991 | Earp | |
| 5,191,341 A | 3/1993 | Gouard et al. | |
| 5,537,380 A | 7/1996 | Sprankle et al. | |
| 6,084,565 A * | 7/2000 | Kiya .............................. | 345/635 |
| 6,225,984 B1 | 5/2001 | Crawford | |
| 6,321,158 B1 | 11/2001 | DeLorme et al. | |
| 6,411,283 B1 | 6/2002 | Murphy | |
| 6,418,080 B2 | 7/2002 | Inouchi | |
| 6,421,299 B1 | 7/2002 | Betts et al. | |
| 6,761,692 B2 | 7/2004 | Angelsen et al. | |
| 6,816,782 B1 | 11/2004 | Walters et al. | |
| 6,909,946 B1 | 6/2005 | Kabel et al. | |
| 7,002,579 B2 | 2/2006 | Olson | |
| 7,236,426 B2 | 6/2007 | Turner et al. | |
| 7,430,461 B1 | 9/2008 | Michaels | |
| 7,607,022 B1 | 10/2009 | Qiu et al. | |
| 7,652,952 B2 | 1/2010 | Betts et al. | |
| 7,710,825 B2 | 5/2010 | Betts et al. | |
| 7,729,203 B2 | 6/2010 | Betts et al. | |

(Continued)

OTHER PUBLICATIONS

PCT International Search Report and Written Opinion; PCT/IB2013/060285; Feb. 18, 2014.

(Continued)

*Primary Examiner* — James Hulka
(74) *Attorney, Agent, or Firm* — Alston & Bird LLP

(57) ABSTRACT

Described herein are implementations of various technologies for a method and apparatus for a method and apparatus for displaying sonar images. In one implementation, sonar images that are currently being recorded may be displayed on a regular pane. Further, condensed sonar images that had previously been recorded and that are currently being recorded may be displayed on a preview pane, while recording the sonar images.

19 Claims, 9 Drawing Sheets

(56) References Cited

U.S. PATENT DOCUMENTS

| | | |
|---|---|---|
| 7,755,974 B2 | 7/2010 | Betts et al. |
| 7,812,667 B2 | 10/2010 | Fagg |
| 7,870,496 B1 | 1/2011 | Sherwani |
| 7,890,867 B1 | 2/2011 | Margulis |
| 8,019,532 B2 | 9/2011 | Sheha et al. |
| 8,063,540 B2 | 11/2011 | Angelsen et al. |
| 2002/0035574 A1 | 3/2002 | Dumas |
| 2002/0093541 A1 | 7/2002 | Schileru-Key |
| 2003/0223733 A1 | 12/2003 | Chang |
| 2004/0193364 A1 | 9/2004 | Chojnacki |
| 2005/0102101 A1 | 5/2005 | Beesley et al. |
| 2005/0163304 A1 | 7/2005 | Judkins et al. |
| 2006/0013066 A1 | 1/2006 | Nishimori et al. |
| 2006/0119585 A1 | 6/2006 | Skinner |
| 2006/0195495 A1 | 8/2006 | Asano |
| 2006/0224940 A1 | 10/2006 | Lee |
| 2008/0126935 A1 | 5/2008 | Blomgren |
| 2008/0192575 A1 | 8/2008 | Coleman |
| 2008/0204424 A1 | 8/2008 | Jin et al. |
| 2009/0064055 A1 | 3/2009 | Chaudhri et al. |
| 2009/0099871 A1 | 4/2009 | Gadodia |
| 2009/0179789 A1 | 7/2009 | Haughay, Jr. et al. |
| 2009/0249247 A1 | 10/2009 | Tseng et al. |
| 2009/0287409 A1 | 11/2009 | Summers |
| 2010/0080082 A1 | 4/2010 | Betts et al. |
| 2010/0145601 A1 | 6/2010 | Kurtti et al. |
| 2010/0199225 A1 | 8/2010 | Coleman et al. |
| 2010/0226203 A1 | 9/2010 | Buttle et al. |
| 2010/0250122 A1 | 9/2010 | Kubota et al. |
| 2011/0004839 A1 | 1/2011 | Cha et al. |
| 2011/0013484 A1 | 1/2011 | Coleman et al. |
| 2011/0013485 A1 | 1/2011 | Maguire |
| 2011/0019887 A1 | 1/2011 | Roehrig et al. |
| 2011/0025720 A1 | 2/2011 | Jo et al. |
| 2011/0154183 A1 | 6/2011 | Burns et al. |
| 2012/0001773 A1 | 1/2012 | Lyons et al. |
| 2012/0011437 A1 | 1/2012 | James et al. |
| 2012/0014220 A1 | 1/2012 | DePasqua |
| 2012/0032974 A1 | 2/2012 | Lynch |
| 2012/0069712 A1 | 3/2012 | Potanin et al. |
| 2012/0106300 A1 | 5/2012 | Maguire |
| 2012/0185801 A1 | 7/2012 | Madonna et al. |
| 2013/0007665 A1 | 1/2013 | Chaudhri et al. |
| 2013/0271301 A1 | 10/2013 | Kabel et al. |
| 2014/0013270 A1 | 1/2014 | Thomas et al. |
| 2014/0013272 A1 | 1/2014 | Thomas et al. |
| 2014/0047379 A1 | 2/2014 | Urawaki et al. |

OTHER PUBLICATIONS

PCT International Search Report and Written Opinion; PCT/US2013/047869; Oct. 21, 2013.

PCT International Search Report and Written Opinion; PCT/US2013/048177; Oct. 21, 2013.

PCT International Search Report and Written Opinion; PCT/US2013/048129; Oct. 17, 2013.

PCT International Search Report and Written Opinion; PCT/US2013/047926; Oct. 11, 2013.

PCT International Search Report and Written Opinion; PCT/US2013/047645; Sep. 27, 2013.

Customizing Workspaces; Adobe Audition Help—http://helpx.adobe.com/audition/using/customizing-workspaces.html; Apr. 11, 2011 (accessed Jan. 24, 2015).

Resize Panel Groups; Adobe Soundbooth—http://help.adobe.com/en_US/Soundbooth/2.0/WSCFC3BDB7-CO2D-4a3b-87B1-DBO4C5D5E8C9.html; Apr. 26, 2007 (accessed Jan. 24, 2015).

"Moom—Move and Zoom Windows"; http://manytricks.com/moom/; 2011 (retrieved Jul. 17, 2015).

"Grid Move"; http://www.pcworld.com/article/232975/gridmove.html; Feb. 25, 2010 (retrieved Jul. 17, 2015).

"5.12 Show Grid"; http://docs.gimp.org/en/gimp-view-show-grid.html; 2006 (retrieved 2015 Jul. 2017).

* cited by examiner

SONAR PREVIEW MODE

CROSS-REFERENCE TO RELATED APPLICATIONS

This application claims the benefit of U.S. Provisional Patent Application Ser. No. 61/668,965, filed Jul. 6, 2012, titled SONAR PREVIEW MODE, and the disclosure of which is incorporated herein by reference.

BACKGROUND

Discussion of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

A log of sonar images can be very useful for marine activities. The operator of a marine vessel monitors marine traffic. A device that is easy to operate can provide advantages to a vessel operator. A device that provides data in an easy to follow format can also provide advantages to the vessel operator. Such advantages may include requiring less time to request and review information, which in turn provides the vessel operator with more time to monitor the marine traffic.

SUMMARY

Described herein are implementations of various technologies for a method and apparatus for providing sonar images. In one implementation, sonar images that are currently being recorded may be displayed on a regular pane. Further, condensed sonar images that had previously been recorded and that are currently being recorded may be displayed on a preview pane, while recording the sonar images.

Described herein are also implementations of various technologies for an apparatus for displaying sonar images. The apparatus includes one or more processors, a screen, and a memory. The memory has a plurality of executable instructions. When the executable instructions are executed by the one or more processors, the processors may display sonar images that are being recorded at a present time, receive a request to display past sonar images that had been recorded at a previous time, and display the past sonar images while still causing the sonar images that are currently being captured at the present time to be recorded.

Described herein are also implementations of various technologies for a non-transitory computer readable medium having stored thereon computer-executable instructions which, when executed by a computer, cause the computer to: display sonar images that are currently being recorded on a regular pane; and display condensed sonar images that had previously been recorded and that are currently being recorded on a preview pane, while recording the sonar images.

In some implementations, a computing system is provided and includes at least one processor, at least one memory, and one or more programs stored in the at least one memory; and means for performing any method disclosed herein.

In some implementations, an information processing apparatus for use in a computing system is provided, and includes means for performing any method disclosed herein.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
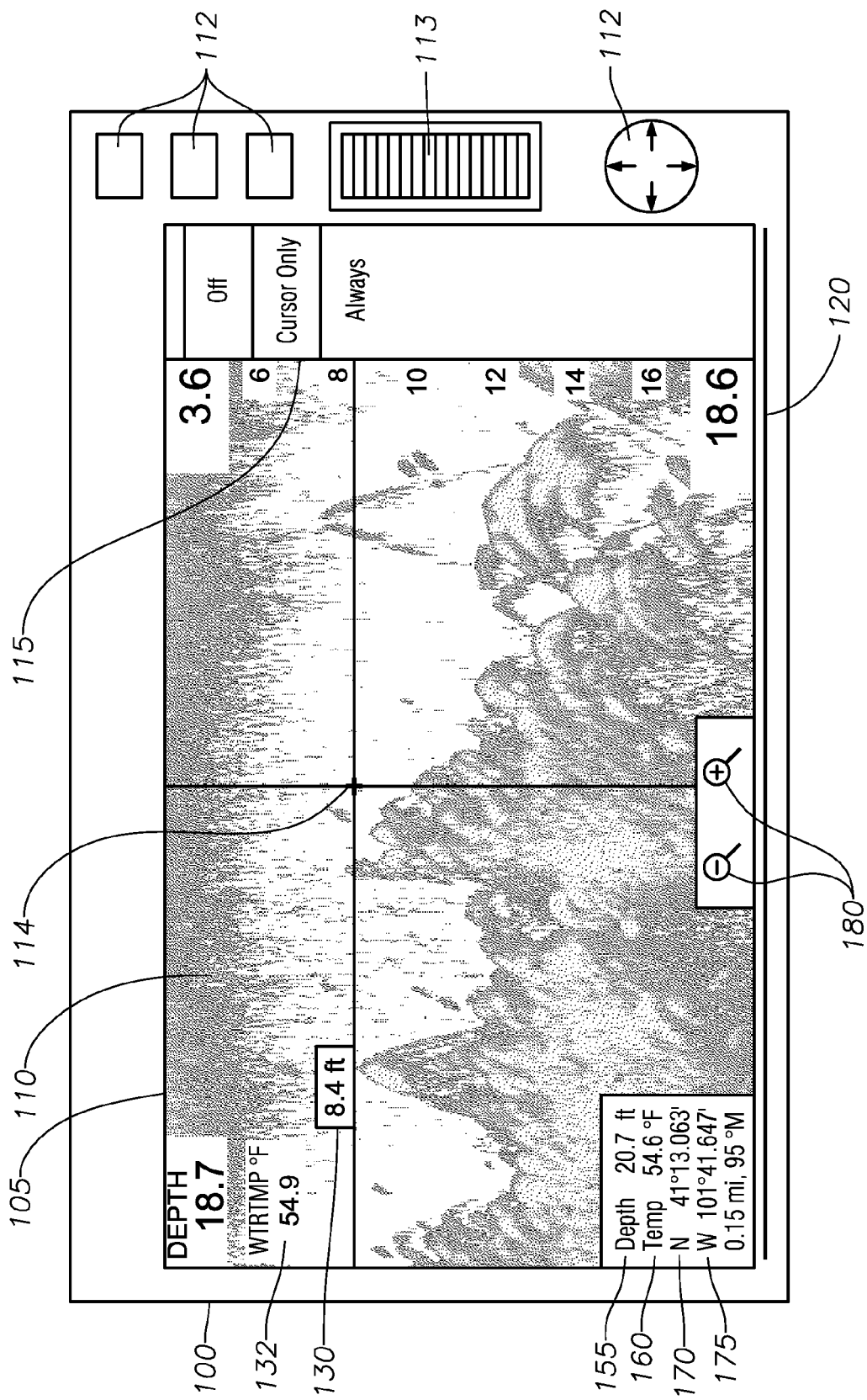
FIG. 1 is a schematic diagram of a display device in accordance with various techniques described therein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

"Alternatively" shall not be construed to only pertain to situations where the number of choices involved is exactly two, but rather refers to another possibility among many other possibilities.

Additionally, various technologies and techniques described herein include receiving user requests for a number of different operations. In certain instances, the user request for a particular operation will be explicitly described. It shall be understood that "user request" or "user can request" shall also include, but are not limited to, touching the screen, double tapping the screen (tapping the screen twice in rapid succession), pressing a particular physical or virtual button, making a selection from a menu, placement of a cursor at a particular location, stylus pointing, mouse selection, an audible command, as well as the explicit description of the "user request" for the particular operation or how the "user can request", explicitly, the particular operations.

In one implementation, various technologies and techniques described herein are directed to a display device having a screen. In one implementation, the screen can display sonar images that are currently being captured as well as sonar images that had previously been captured. The sonar images form a stream of sonar images that may be ordered based on time.

In another implementation, while the screen displays sonar images that are currently being captured, the display device may provide the user access to older portions of sonar images that were captured considerably long before the currently captured sonar images. For example, the user may access to these older portions by placing their finger on the screen over the sonar data and swiping in the direction of the most recent sonar image. The sonar images on the screen will move according to the movement of the finger. Sonar images on the right (the most recent) will move off the screen, and the older sonar images will appear on the left hand side of the screen. The user can continue this process (swiping the screen and moving the displayed sonar data) until the sonar images from a desired time appear on the screen.

While the user accesses older sonar images, the display device may continue to record captured sonar images and add them to the sonar image stream. The user can return to viewing the sonar images that are currently being captured. In one implementation, the user can view the sonar images that are currently being captured while the user is viewing older sonar images by swiping the displayed sonar images to the left. When the displayed sonar images are swiped to the left, the oldest sonar images drop off the right hand side and newer sonar images appear on the left hand side. Although various implementations have been described with the most recent sonar images may appear on the right, while older sonar images may appear on the left, in some implementations, the order can be reversed.

The sonar image stream can be quite lengthy and the user may have to search a long time to view a particular sonar image of interest. In some implementations, the display device may provide a preview of the entire sonar image stream in a smaller region of the screen, e.g., a preview pane. The sonar images in the preview pane may be condensed. However, in certain implementations, the condensed sonar images may be large enough for the user to notice some of the significant characteristics. The user can identify the desired sonar image by spotting the significant characteristics in the condensed sonar image stream. To select the desired sonar image for view in more detail in a regular pane, the user can highlight the desired area in the condensed sonar image stream, and the corresponding sonar image in regular size will appear in the regular pane.

FIG. 1 illustrates a block diagram of a display device 100 in accordance with various implementations described herein. The display device includes a screen 105 that provides a graphical user interface for displaying sonar images 110. Sonar images 110 may provide a map of the underlying body of water in the vicinity of a sonar device. The display device 100 may also include a plurality of buttons 112 to facilitate user interaction. The plurality of buttons 112 can be physical buttons (shown) or virtual buttons (not shown). Additionally, the display device 100 can include a speaker/microphone 113.

In certain implementations, the screen 105 can be touch-sensitive or sensitive to the human body heat of a finger. As such, the display device 100 may be able to detect the location of the screen 105 that is touched by the finger (not shown). In some implementations, the display device 100 may provide a cursor 114. The cursor 114 may be movable by placement of the finger over the cursor 114 and dragging the finger to a desired location. The display device 100 may cause the cursor 114 to follow the finger.

The sonar images 110 may be presented as a two-dimensional graphics, where the vertical axis 115 represents depth and the horizontal axis 120 represents time. The graphical user interface may provide a number of tools to allow the user to obtain more specific information. For example, the user can use the cursor 114 for pointing to a particular location in the graphical user interface. In certain implementations, the display device 100 presents the cursor 114 in response to receiving a user request for the cursor 114.

The graphical user interface can provide specific information about the particular location, such as depth 130 and estimated water temperature 132 at the particular location. The graphical user interface can also provide ocean depth 155, estimated water temperature 160, latitude 170 and longitude 175 at a current location of a vessel carrying the display device 100. The graphical user interface can also provide zooming 180 for more detail or more range.

Sonar equipment (not shown) can capture sonar images in real time. The display device 100 is configured to receive the sonar images and record the sonar images to a recording medium (not shown), such as memory, and also provide the sonar images for display on the screen 105 in real time. In one implementation, the newly captured sonar images 110 appear on the rightmost part of the graphic, while the older sonar images 110 appear towards the left. After some time, the older sonar images 110 on the left move off of the screen. By convention, the right side has more recent sonar images 110 while the left side has older sonar images 110. In certain implementations, the foregoing can be reversed.

In some implementations, the recording medium can be part of the display device, while in other implementations, the recording medium can be external to the display device 100. The display device 100 allows the user to access a previously captured and recorded sonar images.

Figure 2:
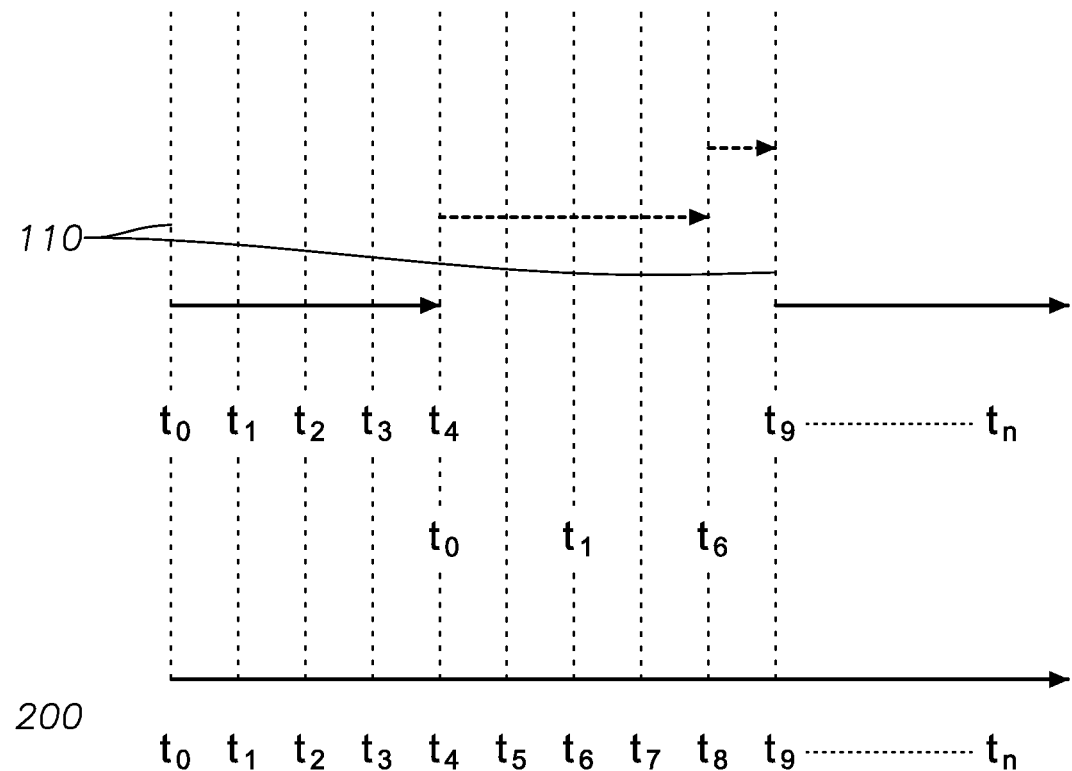
FIG. 2 is a timing diagram in accordance with various techniques described therein.

While the user accesses previously recorded sonar images, the display device 100 may continue to record the sonar images that the sonar device captures into memory. The sonar images are stored and available for display. FIG. 2 illustrates a timing diagram showing different times that sonar images are recorded and displayed. Axis 200 indicates time, $t_0 \ldots t_n$, wherein $t_0$ comes first, $t_1$ comes second, $t_2$ comes third, etc. The sonar images 110 received by the sonar device can be associated with time. For example, at time $t_4$, the user may request the display device 100 to display the sonar images collected at time $t_0$ to $t_1$, which were collected earlier than time $t_4$. The user may review the sonar images collected between time $t_0$ to $t_1$ from $t_4$ to $t_8$ While the user reviews the sonar images at $t_0$ to $t_1$, the sonar images from $t_4$ to $t_8$ are continually being captured and recorded. These sonar images are retrievable for viewing by the user at a later time. For example, at time $t_8$, the user can view sonar images captured at time t6.

The display device 100 may provide the user with at least two ways of requesting access to past sonar images 110. These include a panning mode and a preview mode.

Reviewing Past Sonar Images

A. Panning Mode

Figure 3:
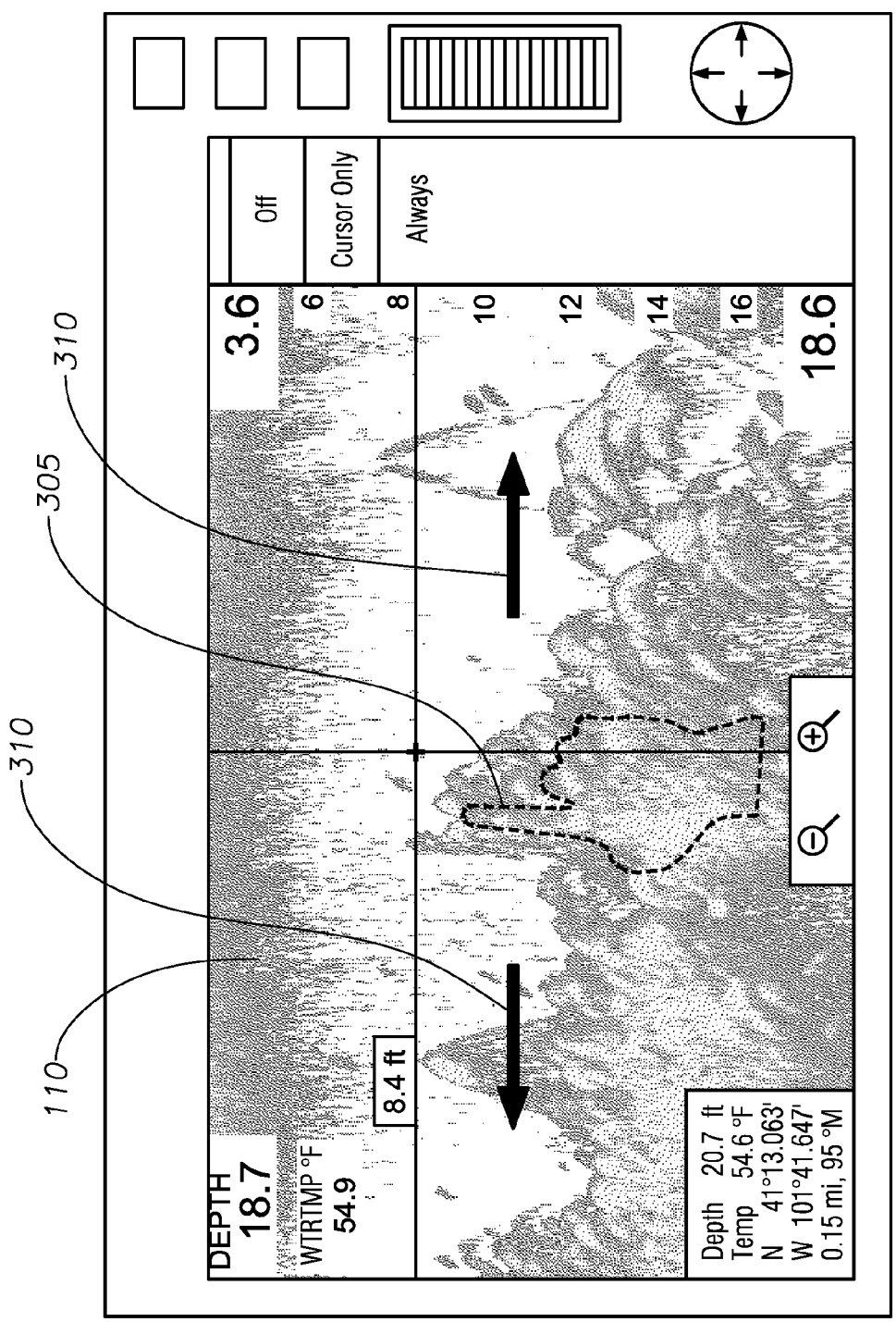
FIG. 3 is a schematic diagram of a graphical user interface showing past sonar images in accordance with various techniques described therein.

FIG. 3 illustrates a schematic diagram of a graphical user interface showing past sonar images 110 by panning. When panning, the user places their finger 305 onto the screen 105 over the sonar images 110 and swipes their finger 305 in a particular direction 310. The sonar images 110 move in the direction of the finger 305. This is known as panning. Certain portions of the sonar images 110 will no longer appear on the screen, while new portions of the recorded sonar images will appear on the screen 105.

For example, swiping the finger 305 to the right provides older sonar images, while swiping the finger 305 to the left provides more recent sonar images. In one implementation, the data will not move to the left if the most recent sonar image 110 is displayed. Additionally, the sonar images 110 will not move to the right once the user reaches the oldest sonar images 110 that are stored. In certain implementations, the user can use one or more of the plurality of buttons 112. For example, some of the plurality of buttons 112 can be associated with directions.

Figure 4:
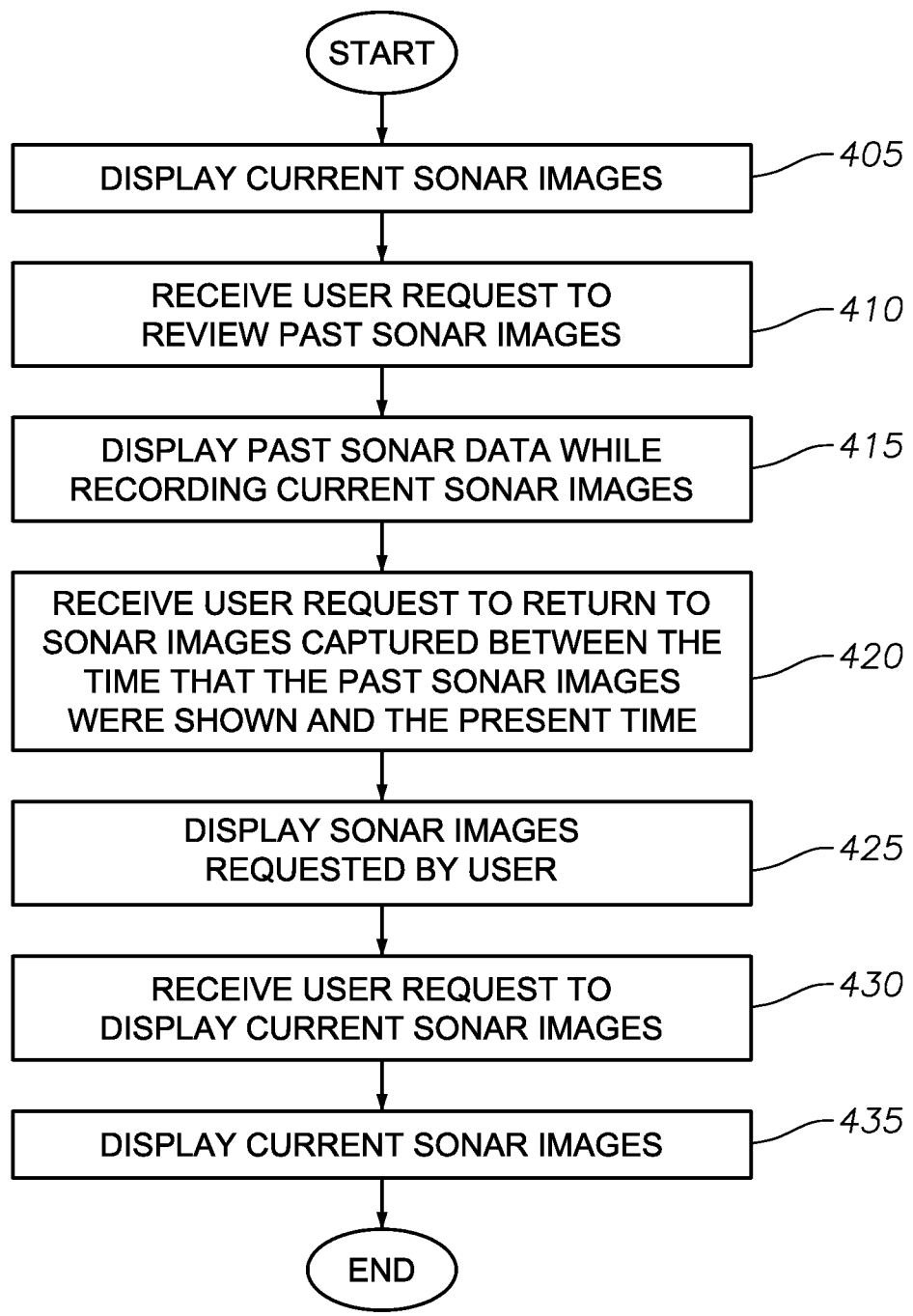
FIG. 4 is a flow diagram describing the display of past sonar images in accordance with various techniques described therein.

FIG. 4 is a flow diagram for reviewing past sonar images 110 in accordance with various implementations described herein. The flow diagram will be described with references to FIGS. 1-3. At block 405, the display device 100 displays current sonar images 110.

At block 410, the display device 100 receives a user request to move the sonar images 110 backwards, or to view past sonar images 110. The user request may include placement of the finger 305 on the screen 105 and swiping the finger to the right. For example, at time $t_4$, the user may wish to review the sonar images 110 captured at $t_0$.

At block 415, when the finger swipe to the right is finished, the desired past sonar images 110 captured at $t_0$ may be displayed on the screen 105. In one implementation, the display device 100 displays the past sonar images 110 in accordance with the user request, while also recording current sonar images. The display device 100 can display the past sonar images 110 by receiving finger swipes that cause the display device to continuously pan the sonar images 110.

At block 420, the display device 100 receives a user request to review sonar images 110 that were just recorded while the user was viewing past sonar images 110 during blocks 410-415. For example, while the user was reviewing past sonar images $t_0$-$t_1$ during blocks 410-415 at times $t_4$-$t_8$, the display device 100 was recording sonar images captured from times $t_4$-$t_8$. At time $t_8$, the user may wish to review the sonar images captured at time $t_6$. In one implementation, the user request can include swiping the finger to the left. The user may continue swiping/panning until the display device 100 displays sonar images captured at time $t_6$.

At block 425, the display device 100 displays the sonar images 110 requested by the user during block 420, e.g., sonar images captured at time $t_6$.

At block 430, while the user is viewing the sonar images captured at time $t_6$, the display device 100 may receive a user request to display the most current sonar images. This user request may be made for example at time $t_9$. The user request can include swiping the screen to the left until the most recent sonar images 110, i.e., sonar images captured at time $t_9$, are displayed on the display device 100. At block 435, the display device 100 displays the most current sonar images, e.g., $t_9 \ldots t_n$.

B. Preview Pane

Figure 5:
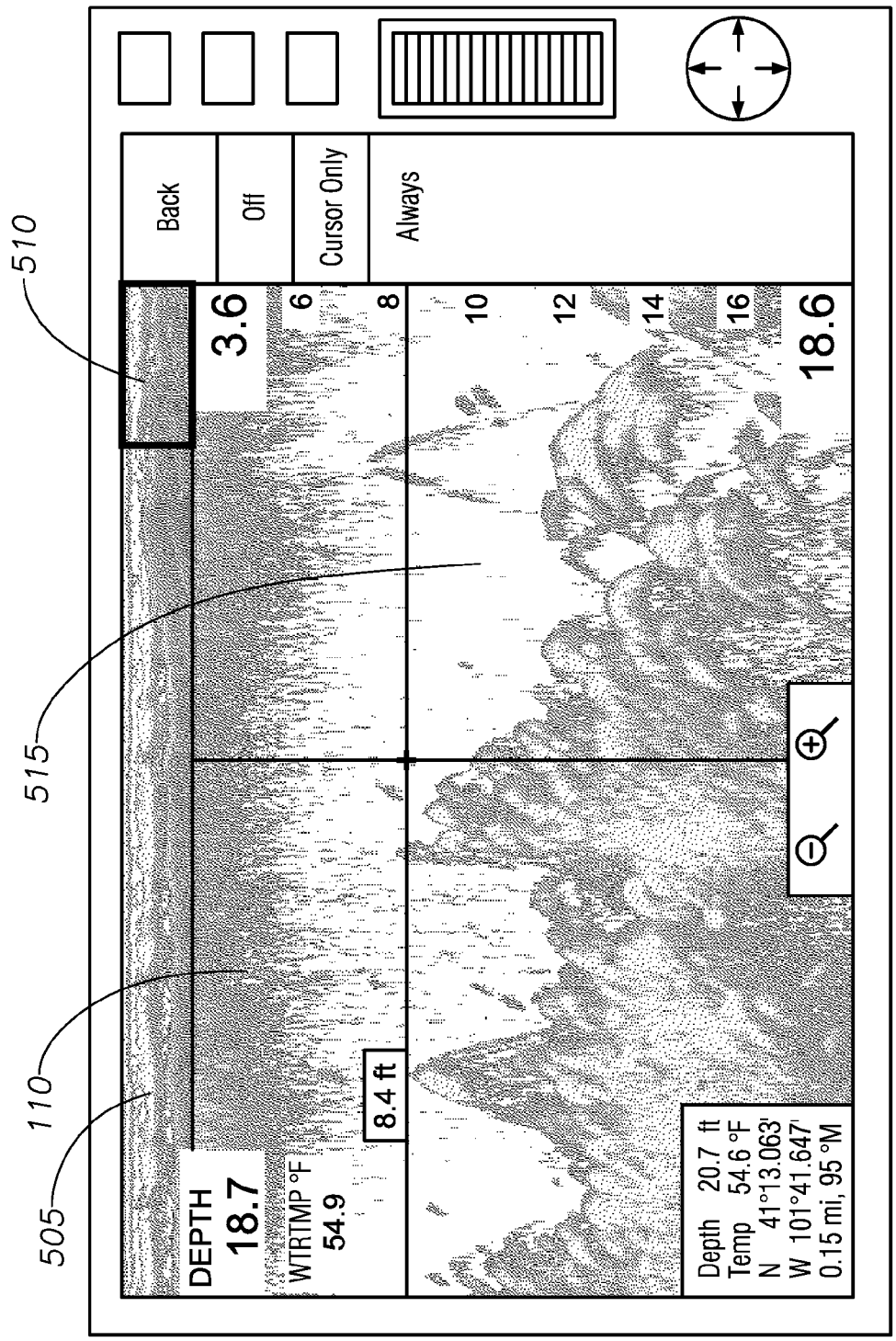
FIG. 5 is a schematic diagram of a graphical user interface with a preview window in accordance with various techniques described therein.

FIG. 5 is a schematic of a graphical user interface with a preview pane 505 in accordance with various implementations described herein. In one implementation, the preview pane 505 displays previously recorded sonar images 110 at a size that is smaller in size to the sonar images 110 displayed in a regular pane 515. In another implementation, the preview pane 505 can include sonar images 110 covering a longer period of time than the regular pane 515. For example, the preview pane 505 can include a condensed version of all the sonar images 110 (condensed sonar images) that have been recorded. The recording medium may have a capacity that limits the time period that the sonar images 110 can be stored. For example, the time period can be about ten minutes. In certain implementations, the preview pane 505 can provide condenses sonar images 110 from the most recent hour. Although the preview pane 505 is described herein as having condensed sonar images, it should be understood that the sonar images may also be in compressed format.

In still another implementation, the preview pane 505 may include a semi-transparent sliding box 510 that identifies the portion of the preview pane 505 representing the sonar images 110 that are shown in the regular pane 515. When the regular pane 515 displays the most current sonar images 110, the sliding box 510 is all the way to the right.

Figure 6:
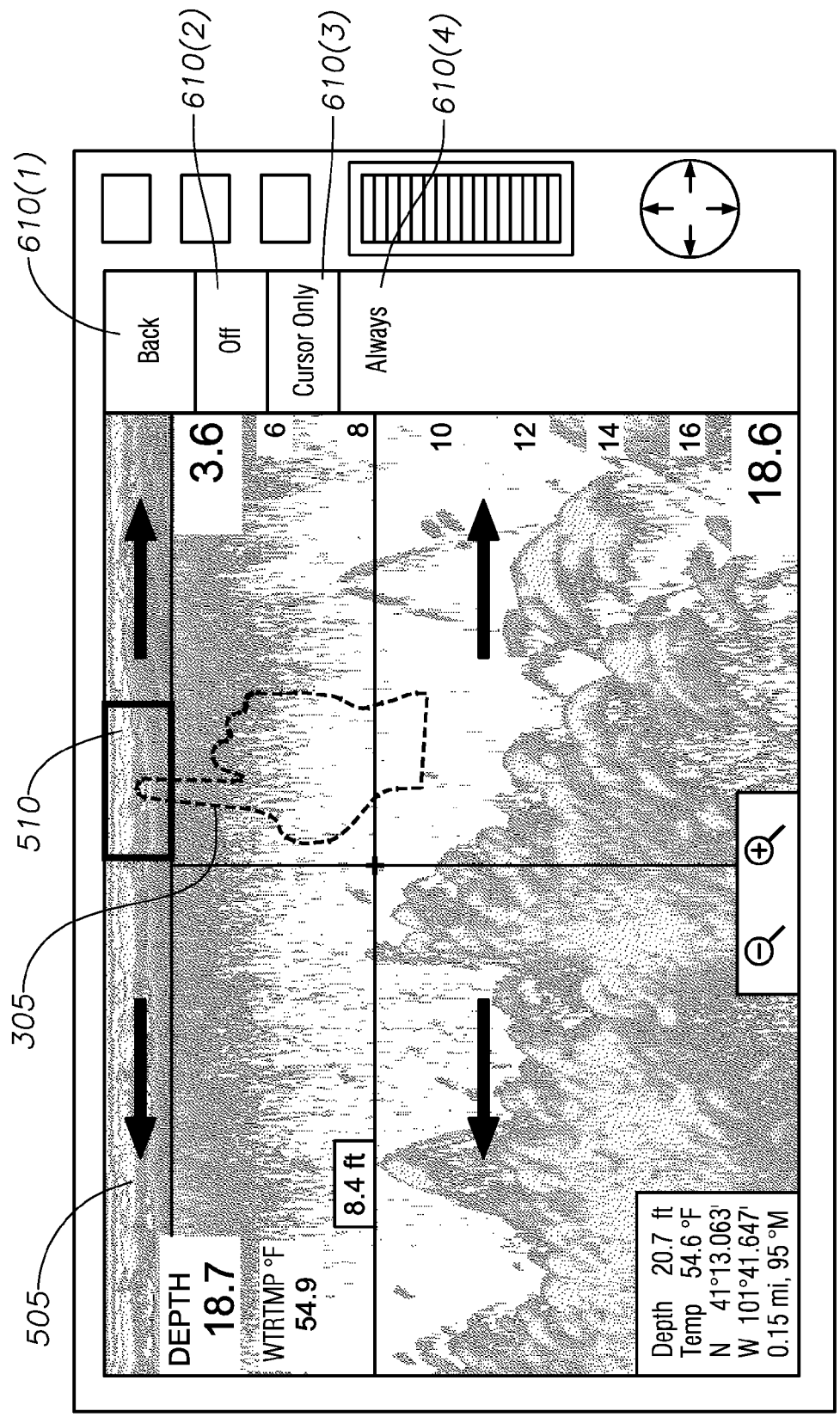
FIG. 6 is a schematic diagram of a graphical user interface showing past sonar images using a preview window in accordance with various techniques described therein.

FIG. 6 illustrates viewing past sonar images 110 using the preview pane 505 in accordance with various implementations described herein. In one implementation, the condensed sonar images in the preview pane 505 are smaller than the sonar images 110 in the regular pane 515, but are still large enough for the user to scan and locate notable features. The condensed sonar images in the sliding box 510 are displayed at regular size in the regular pane 515. In one implementation, moving the sliding box 510 moves the sonar images 110 in the regular pane 515 to correspond to the condensed sonar images in the sliding box 510. The user can switch the positions of the sliding box 510 by placing a finger 305 on the desired condensed sonar images in the preview pane 505. Upon placing the finger 305 on the desired condensed sonar images, the sliding box 510 is displayed around that area and the sonar images in regular size that correspond to the desired condensed sonar images are displayed at the regular pane 515.

In certain implementations, when the user places the finger 305 on the sliding box 510 and swipes the sliding box 510, the sonar images 110 in the regular pane 515 freeze until the user releases the sliding box 510. When the user releases the sliding box 510, the sonar images displayed in the regular pane 515 correspond to the condensed sonar images in the sliding box 510.

Figure 7:
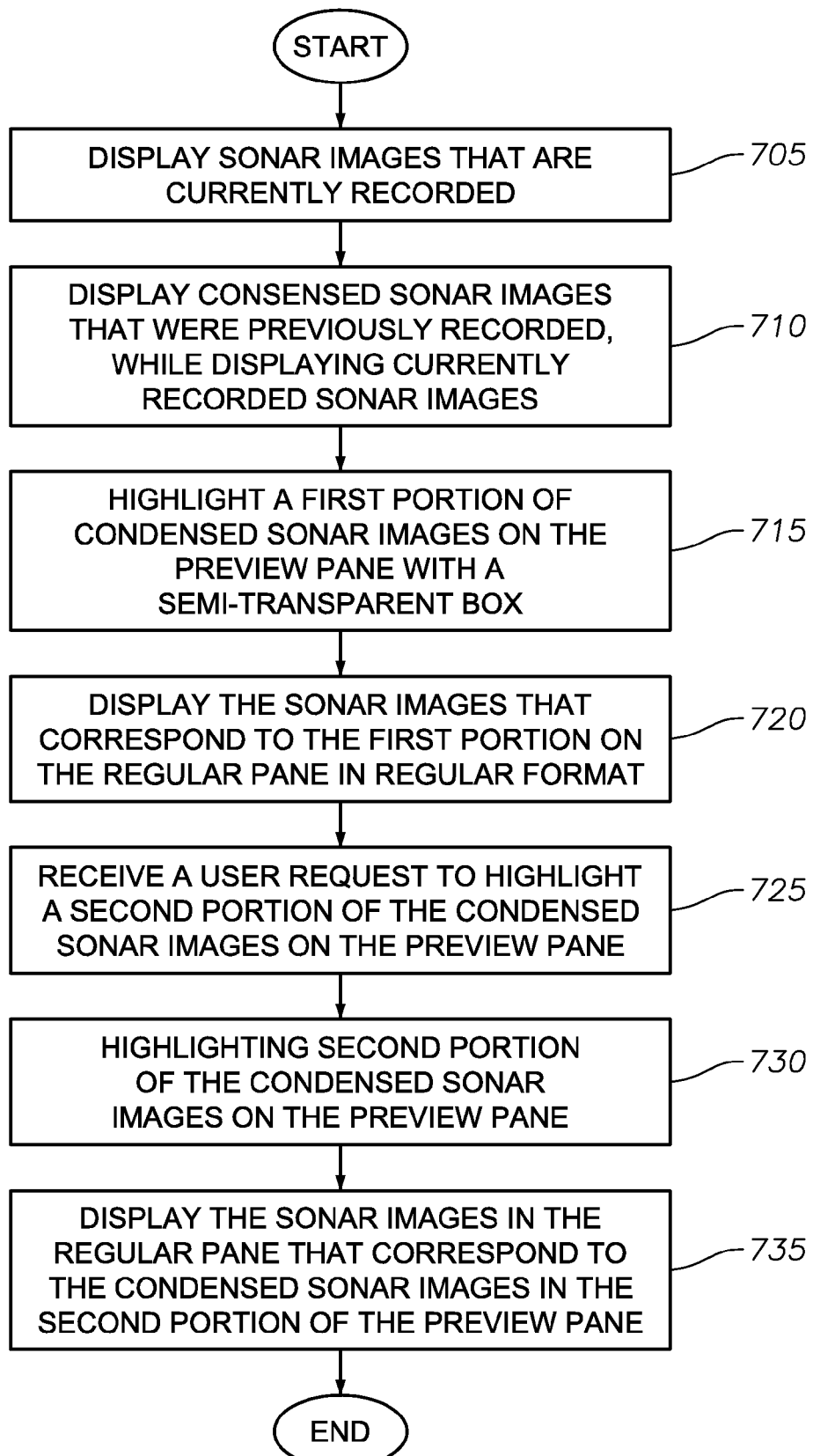
FIG. 7 is a flow diagram for showing past sonar images using a preview window in accordance with various techniques described therein.

FIG. 7 is a flow diagram for reviewing past sonar images 110 using the preview pane 505 in accordance with various implementations described herein. At block 705, the display device 100 displays sonar images 110 that are currently captured in a regular pane 515. At block 710, the display device 100 displays condensed sonar images that were previously recorded in the preview pane 505, while displaying currently recorded sonar images 110. At block 715, the display device 100 highlights a first portion of the condensed sonar images on the preview pane 505 with a semi-transparent box, such as sliding box 510. At block 720, the display device 100 displays the sonar images that correspond to the first portion on the regular pane 515 in regular format.

At block 725, the display device 100 may receive a user request to highlight a second portion of the condensed sonar images on the preview pane 505. The user request can include receiving finger contact with the sliding box 510 and swiping the sliding box 510. Alternatively, the user request can include receiving direct finger contact at the second portion of the preview pane 505.

At block 730, the display device 100 highlights the second portion of the condensed sonar images on the preview pane 505. At block 735, the display device 100 displays the sonar images in the regular pane 515 that correspond to the condensed sonar images in the second portion of the preview pane 505.

Modes of Preview Pane Operation

Returning to FIG. 6, the graphical user interface can include a menu 605 with a "Back" selection 610(1), an "Off" selection 610(2), a "Cursor Only" selection 610(3), and an "Always" selection 610(4). In certain implementations, the display device 100 can be multifunctional and provide additional functions to just sonar image presentation. For example, the "Back" selection 610(1) allows the user to leave the sonar image presentation function and access a higher level menu.

In addition, the display device 100 can provide the preview pane 505, based on user selections. For instance, if the user selects the "Off" selection 610(2), the display device 100 does not display the preview pane 505. The user can also request that the display device 100 always display the preview pane 505 by selection the "Always" selection 610(4). In some implementations, the preview pane 505 appears based on whether there is a cursor 114. If there is no cursor 114, the preview pane 505 does not appear. If there is a cursor 114 present, the preview pane 505 appears. The user can request display of the preview pane based on existence of the cursor 114 by selecting the "Cursor Only" selection 610(3).

Figure 8:
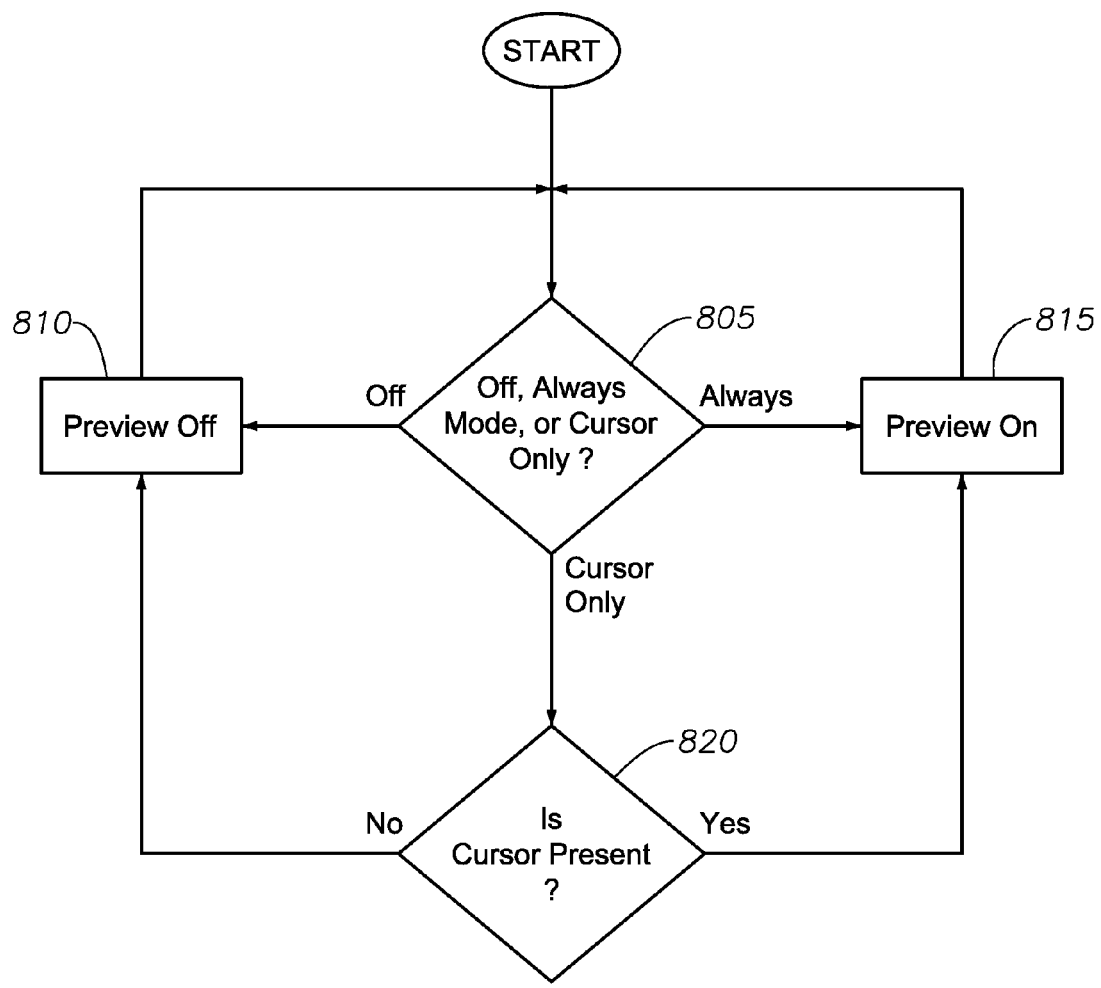
FIG. 8 is a flow diagram describing the preview window modes in accordance with various techniques described therein.

FIG. 8 is a flow diagram for determining whether to place the preview pane 505 or not. At block 805, the display device 100 determines whether the mode is "Off", "Always", or "Cursor Only". If at block 805, the display device 100 determines that the mode is "Off", at block 810, the display device 100 does not display the preview pane 505 and returns to block 805. If at block 805, the display device 100 determines that the mode is "Always", at block 815, the display device 100 displays the preview pane 505 and returns to block 805.

If at block 805, the display device 100 determines that the display device 100 is in "Cursor Only" mode, the display device 100 makes a determination whether the cursor is present (block 820). If the cursor 114 is present, the display device 100 displays the preview pane 505 at block 815 and returns to block 805. If the cursor is not present at block 820, the display device 100 does not display the preview pane 505 (block 815). The display device 100 then returns to block 805.

Computing System

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 9:
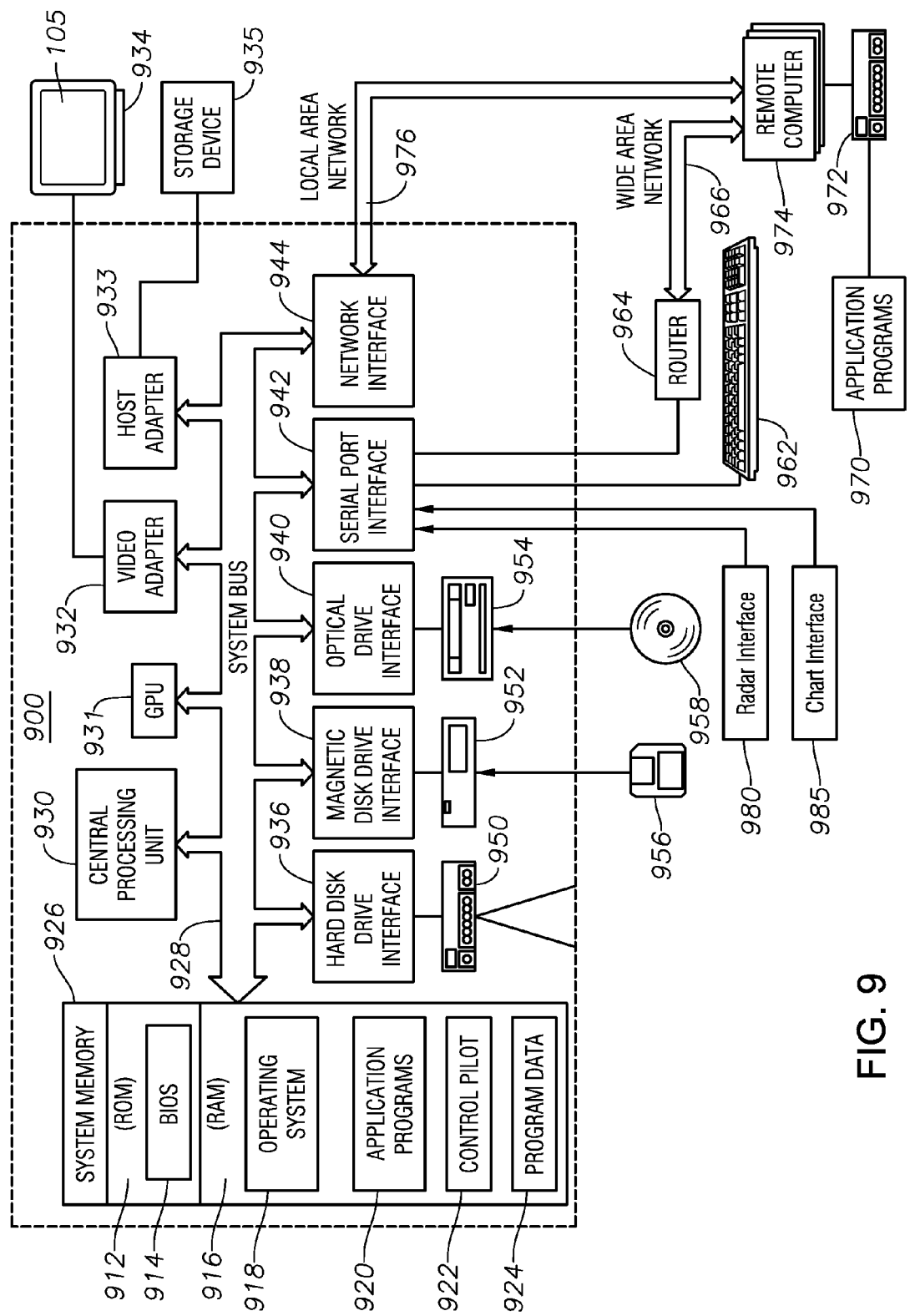
FIG. 9 is a schematic diagram of a computing system in accordance with various techniques described therein.

FIG. 9 illustrates a schematic diagram of a computing system 900 in which the various technologies described herein may be incorporated and practiced. Although the computing system 900 may be a conventional desktop, a handheld device, personal digital assistant, a server computer, electronic device/instrument, laptop, tablet, or part of a navigation system, marine electronics, or sonar system. It should be noted, however, that other computer system configurations may be used.

The computing system 900 may include a central processing unit (CPU) 930, a system memory 926, a graphics processing unit (GPU) 931 and a system bus 928 that couples various system components including the system memory 926 to the CPU 930. Although only one CPU is illustrated in FIG. 9, it should be understood that in some implementations the computing system 900 may include more than one CPU.

The CPU 930 can include a microprocessor, a microcontroller, a processor, a programmable integrated circuit, or a combination thereof. The CPU 930 can comprise an off-the-shelf processor such as a Reduced Instruction Set Computer (RISCTM), or a Microprocessor without Interlocked Pipeline Stages (MIPSTM) processor, or a combination thereof. The CPU 930 can also comprise a proprietary processor.

The GPU 931 may be a microprocessor specifically designed to manipulate and implement computer graphics. The CPU 930 may offload work to the GPU 931. The GPU 931 may have its own graphics memory, and/or may have access to a portion of the system memory 926. As with the CPU 930, the GPU 931 may include one or more processing units, and each processing unit may include one or more cores.

The CPU 930 can provide output data to a graphics processor 931. The graphics processor 931 can generate graphical user interfaces that present the output data. The graphics processor 931 can also provide objects, such as menus, in the graphical user interface. A user can provide inputs by interacting with the objects. The graphics processor 1531 can receive the inputs from interaction with the objects and provide the inputs to the CPU 930.

The system bus 928 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 926 may include a read only memory (ROM) 912 and a random access memory (RAM) 916. A basic input/output system (BIOS) 914, containing the basic routines that help transfer information between elements within the computing system 900, such as during start-up, may be stored in the ROM 912.

The computing system 900 may further include a hard disk drive interface 936 for reading from and writing to a hard disk 950, a magnetic disk drive 952 for reading from and writing to a removable magnetic disk 956, and an optical disk drive 954 for reading from and writing to a removable optical disk 958, such as a CD ROM or other optical media. The hard disk 950, the magnetic disk drive 952, and the optical disk drive 954 may be connected to the system bus 928 by a hard disk drive interface 936, a magnetic disk drive interface 938, and an optical drive interface 940, respectively. The drives and their associated computer-readable media may provide nonvolatile storage of computer-readable instructions, data structures, program modules and other data for the computing system 900.

Although the computing system 900 is described herein as having a hard disk, a removable magnetic disk 956 and a removable optical disk 958, it should be appreciated by those skilled in the art that the computing system 900 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 900. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 900 may also include a host adapter 933 that connects to a storage device 935 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 950, magnetic disk 956, optical disk 958, ROM 912 or RAM 916, including an operating system 918, one or more application programs 920, control pilot 922, and program data 924. In certain implementations, the hard disk 950 may include and a database system. The database system could record, for example, recorded points. The application programs 920 may include various mobile applications ("apps") and other applications configured to perform various methods and techniques described herein. The operating system 918 may be any suitable operating system that may control the operation of a networked personal or server computer.

A user may enter commands and information into the computing system 900 through input devices such as buttons 962. Other input devices may include a microphone (not shown). These and other input devices may be connected to the CPU 930 through a serial port interface 942 coupled to system bus 928, but may be connected by other interfaces, such as a parallel port, game port or a universal serial bus (USB).

Additionally, the user can enter inputs through a monitor 934. As noted above, in certain implementations, the screen 905 can be sensitive to touching by a finger 110, while in other implementations, the screen 905 can be sensitive to the body heat from the finger 110. The screen 905 detects placement and movement of the user's fingers and provides signals that are indicative of such placement and movement to the CPU 930. Additionally, the screen 905 detects user interactions with the objects provided by the GPU 931 and provides signals that are indicative of the user interactions with the objects. The monitor 934 may also be connected to system bus 928 via an interface, such as a video adapter 932.

Further, the computing system 900 may operate in a networked environment using logical connections to one or more remote computers 974. The logical connections may be any connection that is commonplace in offices, enterprise-wide computer networks, intranets, and the Internet, such as local area network (LAN) 976 and a wide area network (WAN) 966. The remote computers 974 may be another computer, a server computer, a router, a network PC, a peer device or other common network node, and may include many or all of the elements describes above relative to the computing system 900. The remote computers 974 may also each include application programs 970 similar to that of the computer action function.

When using a LAN networking environment, the computing system 900 may be connected to the local network 976 through a network interface or adapter 944. When used in a WAN networking environment, the computing system 900 may include a wireless router 964 or other means for establishing communication over a wide area network 966, such as the Internet. The router 964 may be connected to the system bus 928 via the serial port interface 942. In a networked environment, program modules depicted relative to the computing system 900, or portions thereof, may be stored in a remote memory storage device 972. It will be appreciated that the network connections shown are exemplary and other means of establishing a communications link between the computers may be used.

In certain implementations, the computing system 900 can receive sonar signals from a sonar system through the network interface 944.

In certain implementations, the central processing unit 930, GPU 931, video adapter 932, network interface 944, and system memory 926, hard disc 950, monitor 934, and screen 905 can be integrated into a console.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for displaying sonar images, comprising:
    displaying, on a regular pane, sonar images that are currently being recorded;
    displaying, on a preview pane, condensed sonar images that had previously been recorded and that are currently being recorded while recording of the sonar images;
    selecting, on the preview pane, a first portion of the condensed sonar images while the recording the sonar images occurs and while the regular pane is updated with the sonar images and while the preview pane is updated with the condensed sonar images; and
    displaying the sonar images that correspond to the first portion on the regular pane.

2. The method of claim 1, wherein the preview pane is disposed above the regular pane.

3. The method of claim 1, wherein the preview pane is smaller in size than the regular pane.

4. The method of claim 1, wherein the condensed sonar images comprise condensed versions of all the sonar images that are stored in active memory.

5. The method of claim 1, wherein the condensed sonar images are smaller than the sonar images and indicate selectable features of the sonar images.

6. The method of claim 1, wherein the first portion is highlighted by a semi-transparent box over the first portion.

7. The method of claim 1, further comprising:
    receiving a request to highlight a second portion of the condensed sonar images on the preview pane, wherein the second portion is different from the first portion;
    highlighting the second portion of the condensed sonar images on the preview pane; and
    displaying the sonar images that correspond to the second portion on the regular pane.

8. The method of claim 7, wherein the request is a finger swipe.

9. The method of claim 7, wherein the request is a touch.

10. An apparatus for displaying sonar images, the apparatus comprising:
    one or more processors;
    a screen;
    memory having a plurality of executable instructions which, when executed by the one or more processors, cause the one or more processors to:
    display sonar images that are being recorded at a present time;
    display a condensed version of the sonar images that are being recorded at the present time and past sonar images on a second pane;
    receive a request to display the past sonar images that had been recorded at a previous time while the first pane is updated with the sonar images recorded at the present time and while the second pane is updated with the condensed version of the sonar images, wherein the request is associated with either the first pane or the second pane; and
    display, on the first pane, the past sonar images associated with the request while still displaying the sonar images that are currently being recorded at the present time.

11. The apparatus of claim 10, wherein the plurality of executable instructions further cause the one or more processors to:
    receive a request to display a portion of the sonar images that were captured at the present time while displaying the past sonar images; and
    display the portion of the sonar images.

12. The apparatus of claim 11, wherein the request to display the portion comprises a finger swipe over the past sonar images.

13. The apparatus of claim 10, wherein the second pane is smaller than the first pane.

14. The apparatus of claim 10, wherein the second pane is disposed above the first pane.

15. The apparatus of claim 10, wherein the plurality of executable instructions further cause the one or more processors to:
    highlight a first portion of the condensed version of the sonar images and the past sonar images on the second pane; and
    display the sonar images that corresponds to the first portion on the first pane.

16. The apparatus of claim 15, wherein the first portion is highlighted by a semi-transparent box over the first portion.

17. A non-transitory computer readable medium having stored thereon computer-executable instructions which, when executed by a computer, cause the computer to:
- display, on a regular pane, sonar images that are currently being recorded; and
- display, on a preview pane, condensed sonar images that had previously been recorded and that are currently being recorded, while recording the sonar images;
- select, on the preview pane, a first portion of the condensed sonar images while the regular pane is updated with the sonar images and while the preview pane is updated with the condensed sonar images; and
- display the sonar images that correspond to the first portion on the regular pane.

18. The non-transitory computer readable medium of claim 17, wherein the preview pane is disposed above the regular pane.

19. The non-transitory computer readable medium of claim 17, wherein the preview pane is smaller in size than the regular pane.

* * * * *